3,822,186
PRESSURE VESSEL

Gundolf Rajakovics, Wien, Austria, assignor to Gebr. Boehler & Co. AG., Kepfenberg, Austria
Filed Aug. 9, 1971, Ser. No. 169,950
Claims priority, application Austria, Aug. 21, 1970, 7,586/70
Int. Cl. G21c 13/02
U.S. Cl. 176—87
6 Claims

ABSTRACT OF THE DISCLOSURE

An inner container has an inner bottom and defines an inner space and is adapted to hold a liquid coolant in said inner space to a predetermined level. An outer container contains said inner container and has an outer bottom spaced below said inner bottom. The outer container defines with said inner container an outer space extending below and around said inner container. A solid heat-insulating layer extends in said outer space below and around said inner container and upwardly at least to said predetermined level.

SPECIFICATION

This invention relates to a pressure vessel for nuclear reactors preferably cooled with liquid metal or for plants for simulating technological conditions arising in such reactor, which vessel comprises an outer container and an inner container which has a bottom of its own and serves to receive hot liquid coolant, particularly hot liquid metal, and in which the space defined between said containers communicates with the space enclosed by the inner container.

The known pressure vessels of sodium-cooled nuclear reactors have the disadvantage that they do not resist the superatmospheric pressure arising therein at the high coolant temperatures which are desired in such reactors.

It is an object of the invention to avoid said disadvantage and to provide for sodium-cooled nuclear reactors a pressure vessel which will resist the superatmospheric pressures arising therein when the liquid sodium contained in the vessel is at a very high temperature.

In a pressure vessel of the kind defined first hereinbefore, that object is accomplished in that a solid heat-insulating layer is provided between these two containers and extends at least to the level of the hot liquid coolant contained in the inner container and consists, e.g., of a heat-insulating material which comprises mineral wool, asbestos fibers, and an inorganic binder. As a result, the outer container is at a much lower temperature than the inner container and for this reason has such a high strength as to resist the superatmospheric pressure in the pressure vessel. Whereas the inner container has a relatively low strength because it is at a high temperature, it must take up only the hydrostatic pressure of the hot liquid coolant contained in the inner container.

In a preferred embodiment of the pressure vessel according to the invention, that portion of the heat-insulating layer which extends substantially throughout the range of the height of the hot liquid coolant contained in the inner container and preferably throughout the length of the inner container is surrounded by a separate sheet metal covering, which is preferably provided on its outside with one or more expansible elements, which serve for a length compensation and have the shape of sectors of a circular ring in cross-section.

Further details of the present pressure vessel will become apparent from the following description of an embodiment which is diagrammatically shown on the drawing.

The drawing is a longitudinal sectional view showing a pressure vessel for a sodium-cooled nuclear reactor.

Two concentric containers 1 and 2 are provided, which consist of stainless and acid-resisting chromium-nickel steel. Each container comprises a vertically extending, cylindrical shell. A solid, permeable, heat-insulating layer 3 is provided between the containers 1 and 2 and consists of a known heat-insulating material containing mineral wool, asbestos fibers, and an inorganic binder. That portion of the heat-insulating layer 3 which extends throughout the length $l$ of the open-topped inner container is surrounded by a separate covering 4, which is made of thin sheet metal. Said portion protrudes above the height $h$ of the liquid sodium contained in the inner container 2. The above-mentioned covering 4 is provided on its outside with expansible elements 5, which serve for a length compensation and have in cross-section the shape of sectors of a circular ring; these sectors extend through angles of more than 180°. The expansible elements 5 are made by turning from rings having the shape of a circular ring in cross-section and are welded to the shell of the covering 4. Those two portions of the heat-insulating layer which extend respectively between the bottom of the inner container 2 and the bottom of the outer container 1 and above the inner container 2 are surrounded by respective coverings 4' and 4" made from thin sheet metal. There are respective clearances between the outer container 1 and the coverings 4, 4', 4" and between said coverings and the inner container 2. To avoid stresses due to temperature influences, the inner container 2 is secured to the outer container 1 by means of feet 6 only near one end, preferably at its lower end portion. Above the liquid sodium contained in the inner container 2, the latter contains an inert gas consisting of argon under a considerable pressure above the ambient atmosphere. For an equalization of pressure, the covering 4, 4', 4" of the several portions of the heat-insulating layer 3 are connected by pipelines 7, 8, 9 to one another and to a condensate trap 11, which communicates through another pipeline 10 to the outer container 1. The pipelines 9 and 10 extending from the uppermost covering 4" and the upper portion of the outer container 1 extend from above into the condensate trap 11, which is closed during the operation of the reactor.

Compared to the known pressure vessels of nuclear reactors cooled with liquid metal, the pressure vessel according to the invention affords the highly essential advantage that much higher coolant temperatures may be used in said reactor even when the pressure vessel consists of the same material as the known pressure vessels used with such reactors.

What is claimed is:

1. A pressure vessel adapted for use in liquid metal cooled nuclear reactors or in installations for simulating technical conditions arising in such reactors, comprising an outer container in the form of a closed upright tank, an inner container in the form of an open-topped upright tank disposed within the outer container with the side walls and bottom of the inner container spaced appreciable distances from the side walls and bottom of the outer container and with the upper edge of the inner container spaced substantially from the top of the outer container, the inner container being adapted to receive hot cooling liquid such as hot liquid metal, the spaces between the side walls of the two containers, between their bottoms, and between the upper edge of the open inner container and the upper part of the closed outer container all being connected for the flow of gas therebetween, metal enclosures disposed between and spaced from the side walls of the two containers, between and spaced from the bottoms thereof, and above and spaced from the top of the inner container, said metal enclosures being filled with solid heat-insulating material, and conduit means interconnecting the spaces within said metal enclosures.

2. A pressure vessel in accordance with claim 1, wherein the metal enclosure between the side walls of the inner and outer containers extends throughout the entire height of the hot cooling liquid contained in the inner container and also substantially over the complete height of the inner container, at least one of the side walls of the metal enclosure surrounding the inner container containing annular concave trough-like members which permit the lengthening and shortening of the said side wall of the metal encasement upon the heating and cooling thereof.

3. A pressure vessel according to claim 2, wherein the metal enclosures are sequentially connected to each other by pipes, and comprising a condensate separating trap which is interposed in conduits extending between the upper part of the outer container and the interior of the metal enclosure disposed above the inner container.

4. A pressure vessel according to claim 2, wherein the annular trough-like formations in the wall of a metal enclosure surrounding the inner container subtend an angle larger than 180°.

5. A pressure vessel according to claim 4, wherein the annular trough-like formations in one of the walls of the metal enclosure between the side walls of the inner and outer containers are welded to the remainder of the said side wall of such metal enclosure.

6. A pressure vessel according to claim 1, comprising means for supporting the inner container within the outer container, said last-named means comprising means affixing the inner container to the outer container at only the lower ends of the two containers whereby to avoid stresses in the containers arising from expansion and contraction thereof by reason of changes in their temperatures.

References Cited

UNITED STATES PATENTS

| | | | |
|---|---|---|---|
| 2,303,126 | 11/1942 | Koppel | 220—9 A |
| 3,548,931 | 12/1970 | Germer | 176—87 X |
| 3,443,631 | 5/1969 | Bremer et al. | 176—87 X |
| 3,290,222 | 12/1966 | Schoessow et al. | 176—37 |
| 3,322,141 | 5/1967 | Gans et al. | 176—38 V |
| 3,497,421 | 2/1970 | Thome | 176—87 X |
| 3,121,046 | 2/1964 | Trickett et al. | 176—87 X |
| 3,169,117 | 2/1965 | Dickinson et al. | 176—87 X |
| 3,288,998 | 11/1966 | Press | 176—Digest 2 |
| 3,110,156 | 11/1963 | Neimann | 220—9 A |

HARVEY E. BEHREND, Primary Examiner

U.S. Cl. X.R.

176—38; 220—9 A